United States Patent [19]

Monk et al.

[11] Patent Number: 5,614,896
[45] Date of Patent: *Mar. 25, 1997

[54] METHOD AND SYSTEM FOR AIRCRAFT WEAPON STATION TESTING

[75] Inventors: R. Winston Monk; David P. Van Cleve, both of Tucson, Ariz.

[73] Assignee: Hughes Missile Systems Company, Los Angeles, Calif.

[ * ] Notice: The term of this patent shall not extend beyond the expiration date of Pat. No. 5,414,347.

[21] Appl. No.: 409,106

[22] Filed: Mar. 23, 1995

[51] Int. Cl.⁶ .................................................. G08B 21/00
[52] U.S. Cl. .................. 340/945; 89/1.56; 89/1.819; 89/1.59; 73/167; 324/73.1; 324/158.1
[58] Field of Search .................... 340/945; 89/1.51, 89/1.55, 1.56, 1.57, 1.819, 37.5 R; 73/167, 431; 364/423, 424.03, 424.01, 424.06; 324/73.1, 158.1

[56] References Cited

U.S. PATENT DOCUMENTS

| | | | |
|---|---|---|---|
| 3,609,312 | 9/1971 | Higgins | 364/423 |
| 3,781,676 | 12/1973 | Williams | 324/72.5 |
| 4,825,151 | 4/1989 | Aspelin | 324/73.1 |
| 5,034,686 | 7/1991 | Aspelin | 89/1.59 |
| 5,036,465 | 7/1991 | Ackerman, Jr. et al. | 364/423 |
| 5,131,272 | 7/1992 | Minei et al. | 324/73.1 |
| 5,414,347 | 5/1995 | Monk et al. | 324/73.1 |

FOREIGN PATENT DOCUMENTS

579143  1/1994  European Pat. Off. .

*Primary Examiner*—Thomas Mullen
*Assistant Examiner*—Benjamin C. Lee
*Attorney, Agent, or Firm*—Charles D. Brown; Wanda K. Denson-Low

[57] ABSTRACT

A weapon station testing system for testing the mission readiness of an aircraft (10) having a plurality of weapon stations including a first weapon station (12a) and a second weapon station (12b) comprises a common electronics module (14) and a plurality of interchangeable mechanical fixtures (16a, 16b). A first interchangeable fixture (16a) is operative for interconnecting the common electronics module (14) with the first weapon station (12a). A second interchangeable fixture (16b) is operative for interconnecting the common electronics module (14) with the second weapon station (12b).

20 Claims, 8 Drawing Sheets

METHOD AND SYSTEM FOR AIRCRAFT WEAPON STATION TESTING

BACKGROUND OF THE INVENTION

1. Technical Field

The present invention relates generally to a method for aircraft weapon station testing and a weapon station testing system. More particularly, the present invention relates to a method and system for aircraft weapon station testing which includes an interchangeable fixture adapted to operatively interconnect a common electronics module with various types weapon stations for testing of the operational readiness of any compatible launch platform.

2. Discussion

Most military aircraft are designed to be equipped with an aircraft armament system. The armament system of a particular aircraft comprises one or more types of weapon stations, including pylons, launchers, racks and gun systems, missiles and the like. Within typical military aircraft resides a computer which is responsive to pilot commands and communicates with each weapons station to monitor status, perform launch preparation, and execute launch commands. A missile interface system receives commands from the computer and translates these commands to provide data used to monitor or control the weapon stations. A typical on-board missile interface includes an umbilical interface which serves to communicate with the missiles prior to launch separation.

Prior to deployment of an aircraft, it is necessary to fully test (e.g. simulate and evaluate) the communications between the aircraft and each weapon station. In addition, weapon stations need to be tested during new aircraft development and/or manufacture, and after any maintenance performed on operational aircraft. Test equipment which is used to conduct weapon station simulation and evaluation is designed to test the mission readiness of an aircraft by verifying that all components are in working order and that all connections are sound.

Recent emphasis in the downsizing of the defense budget has resulted in decreased personnel strength levels and weapon system force structures. Such reductions have resulted in an increased need for cost-effective ways for military services to meet their daily operational requirements. A current effort in the military exists to shift to two levels of weapons system maintenance, organizational and depot. Advanced automatic test equipment is required to meet the new structure of this environment.

Traditionally, organizational level automatic test equipment for mainline combat aircraft has been developed uniquely for each individual armament system. Further complicating matters, unique automatic test equipment is generally created with each succeeding model of an aircraft. As a result, at one time, thirty-six (36) different testers were fielded to support the A-10, F-111, F-15 and F-16 weapons release systems alone.

Simultaneously with the downsizing of the defense budget, weapon systems have evolved towards an ever increasing complexity. A high degree of confidence in the mission readiness of an aircraft is available only by exercising the aircraft's weapons functions in a realistic manner. Current testing of modern weapons functions on operational aircraft typically utilizes relatively rudimentary test equipment. When specialized test equipment exists, it is tailored to support only one, or perhaps two weapon systems, and predominantly verifies only the presence or absence of necessary weapon interface signals.

This simple verification test is described as a "static" test or a "continuity" test and is unable to provide a sufficiently high degree of confidence in the mission readiness for modern weapons. Sufficient confidence for modern weapons stores is only obtained through a "dynamic" test which not only confirms the presence of certain signals, but also confirms that the necessary signals are present at the correct times and that transmission of large volumes of specific data occurs correctly over one or more serial data buses.

Heretofore, reliability of tactical and strategic armament systems has been dependent upon cumbersome and unreliable weapons system particular testers. These testers are designed for the specific purpose of performing complex electrical functional checks of aircraft monitor, release, launch and firing circuits (organizational maintenance) or armament store circuits (intermediate maintenance). In addition, there exists a multitude of particular armament related avionics, radar and mission planning testers.

The large number of different types of testing equipment which currently exists requires an inordinate amount of training and skill for armament and other personnel. Currently, interoperability between armament test equipment and different aircraft is generally non-existent and peculiar testers continue to be fielded. These testers require complex cabling and multiple connectors and are associated with high costs for provisioning and maintenance. In almost all cases, extraordinary measures are necessary to maintain the required reliability and maintainability of any particular armament system.

Further, logistics problems are prevalent with the use of current test equipment. In this regard, many "black boxes" are returned from depot maintenance in a satisfactory condition because the problem apparently encountered in the field could not be duplicated. This type of problem is directly attributable to the inherent limitations of conventional organizational armament test equipment.

While prior systems have proven moderately successful in the testing of weapons systems, none are without their inherent drawbacks, including those noted above.

SUMMARY OF THE INVENTION

The present invention overcomes the above-discussed and other drawbacks of the prior art by providing a weapon station testing system for various weapons systems. The weapon station tester of the present invention is designed for testing the mission readiness of an aircraft weapons system having a plurality of weapon stations.

In a first aspect, the present invention comprises a weapon station testing system for testing the mission readiness of an aircraft weapons system having a plurality of weapon stations including a first weapon station and a second weapon station. The weapon station testing system includes a common electronics module and is preferably adapted for capturing and recording a plurality of data transactions occurring at one of the weapon stations and for analyzing the plurality of data transactions. The weapon station testing system further includes a first interchangeable fixture for operatively interconnecting the common electronics module with a first weapon station and a second interchangeable fixture for operatively interconnecting the common electronics module with the second weapon station. The common electronics module also preferably includes means for selectively executing a first series of simulated weapons stores responses for testing a first weapon station and second series of simulated weapons stores responses for testing a second weapon station.

The first interchangeable fixture further preferably includes a first identification means for identifying the first weapon station which is operative for selecting one of the first and second series of simulated weapons stores.

In a second aspect, the present invention comprises a weapon station testing system for testing the mission readiness of an aircraft weapons system having a plurality of weapon stations. The plurality of weapon stations includes a first weapon station and a second weapon station. The first weapon station has a first weapon interface adapted for electrically communicating with a first weapon and a second weapon interface adapted to electrically communicate with a second type of weapon. The weapon station testing system includes a common electronics module preferably including means for capturing and recording a plurality of data transactions at one of the plurality of weapon stations and means for analyzing the plurality of data transactions.

The weapon station testing system further includes a first interchangeable fixture for mechanically engaging the common electronics module with the first weapon station. The first interchangeable fixture further includes a first input port adapted to selectively electrically communicate with the first weapon interface and a second input port adapted to selectively electrically engage the second weapon interface. The weapon station testing system further includes a second interchangeable fixture for operatively interconnecting the common electronics module with the second weapon station.

In a third aspect, the present invention comprises a method for testing the mission readiness of an aircraft weapons system having a plurality of weapon stations. The aircraft weapons system is of the type having a plurality of weapon stations including a first weapon station and a second weapon station. The first weapon station has a first weapon interface normally adapted for electrically communicating with a first type of weapon and a second weapon interface normally adapted to electrically communicate with a second type of weapon. The method includes the step of providing an aircraft weapons testing system including a common electronics module for capturing and recording a plurality of data transactions occurring at one of the plurality of weapon stations, a first interchangeable fixture, and a second interchangeable fixture. The method further includes the steps of interconnecting the common electronics module with the first interchangeable fixture, mechanically engaging the first interchangeable fixture with the first weapon station, and recording at least one data transaction occurring at the first weapon station. Next, the method of the present invention includes the steps of interconnecting the common electronics module with the second interchangeable fixture, mechanically engaging the second interchangeable fixture with the second weapon station, and recording at least one data transaction occurring at the second weapon station.

BRIEF DESCRIPTION OF THE DRAWINGS

Various advantages of the present invention will become apparent to one skilled in the art by reading the following specification and subjoined claims and by referencing the following drawings in which:

DETAILED DESCRIPTION OF THE PREFERRED EMBODIMENT

Certain terminology is used in the following description for convenience only and is not intended to be limiting. For example, words such as "upper" designate directions in the drawings to which reference is being made. Also in the drawings, where similar reference characters designate like parts throughout the several views, illustrated is a preferred embodiment of the present invention. It will be appreciated by those skilled in the art that the particular embodiment shown throughout the drawings is offered as an example which incorporates the teachings of the present invention and is merely exemplary.

The weapon station testing system of the present invention is particularly adapted for flight-line testing functions of the guided weapons system on an aircraft 10 to confirm the ability of the aircraft 10 to support a wide variety of missions. More specifically, the weapon station testing system of the present invention is adapted for dynamically testing the weapon stations 12 of the aircraft 10.

The weapon station testing system of the present invention includes a common electronics module 14 and interchangeable mechanical fixture means for selectively interconnecting the common electronics module 14 with one of a plurality of different types of weapon stations 12. In order to illustrate the flexibility of the present invention, the exemplary aircraft 10 illustrated in FIGS. 1 and 2 of the drawings is shown to include two types of weapon stations-rail launcher stations 12a and eject launcher stations 12b. The rail launcher stations 12a shown in the drawings are commercially available from Hughes Aircraft as Part Nos.

LAU-127, LAU-128 and LAU-129. The illustrated eject launcher station 12b is commercially available from Hughes Aircraft as Part No. LAU-106.

The mechanical fixture means for selectively interconnecting the common electronics module 14 with one of the weapon stations 12a and 12b includes interchangeable mechanical fixture means preferably comprising an interchangeable fixture (16a, 16b). Further preferably, the mechanical fixture means comprises a plurality of interchangeable fixtures 16 including at least first and second interchangeable fixtures, respectively designated in the drawings as 16a and 16b.

Figure 1:
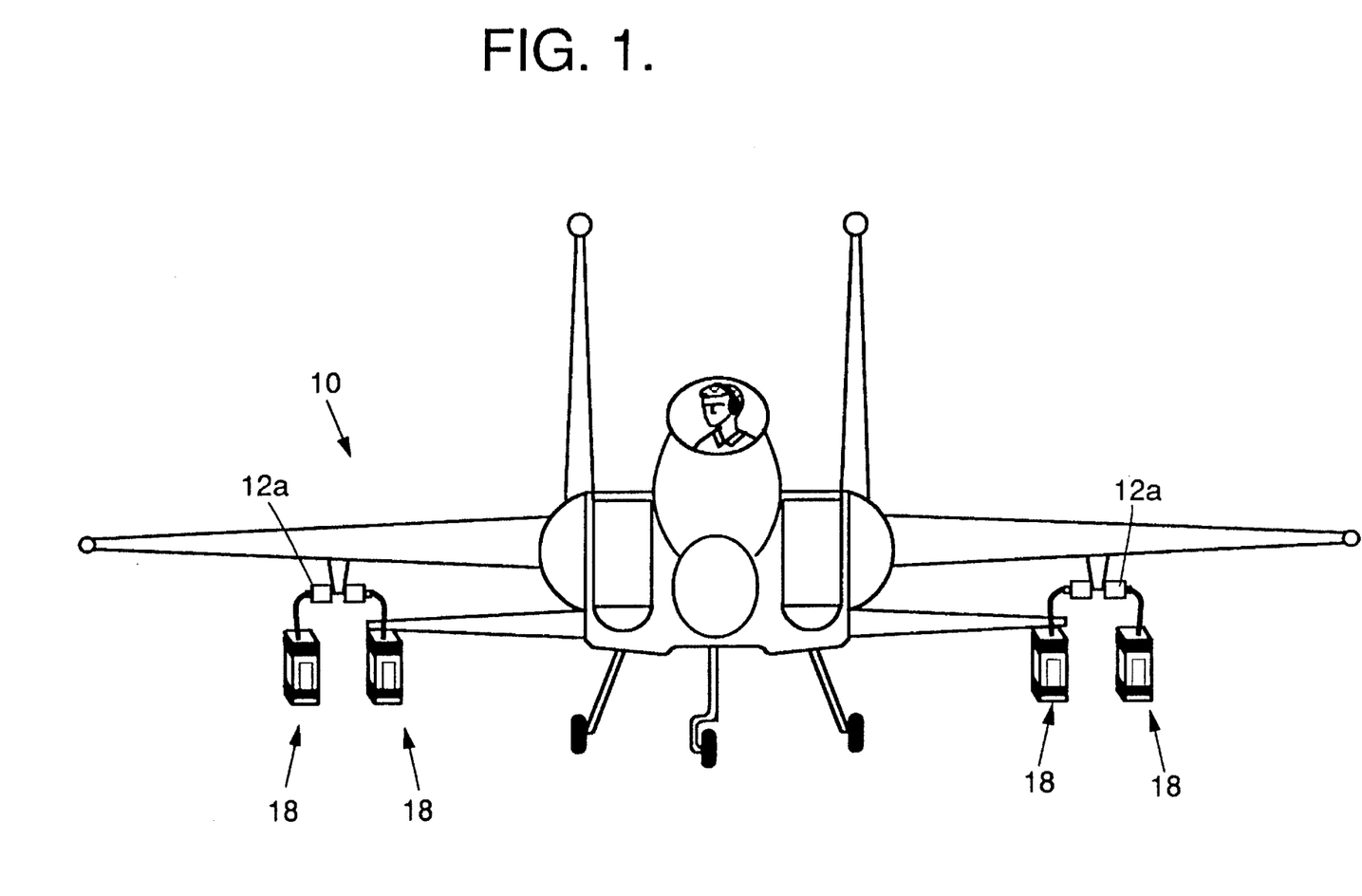
FIG. 1 is a front view of a representation of an F-15 aircraft illustrated to include a plurality of weapon station testers constructed according to the preferred embodiment of the present invention in operative connection with a corresponding plurality of weapon stations of the aircraft.
Figure 2:
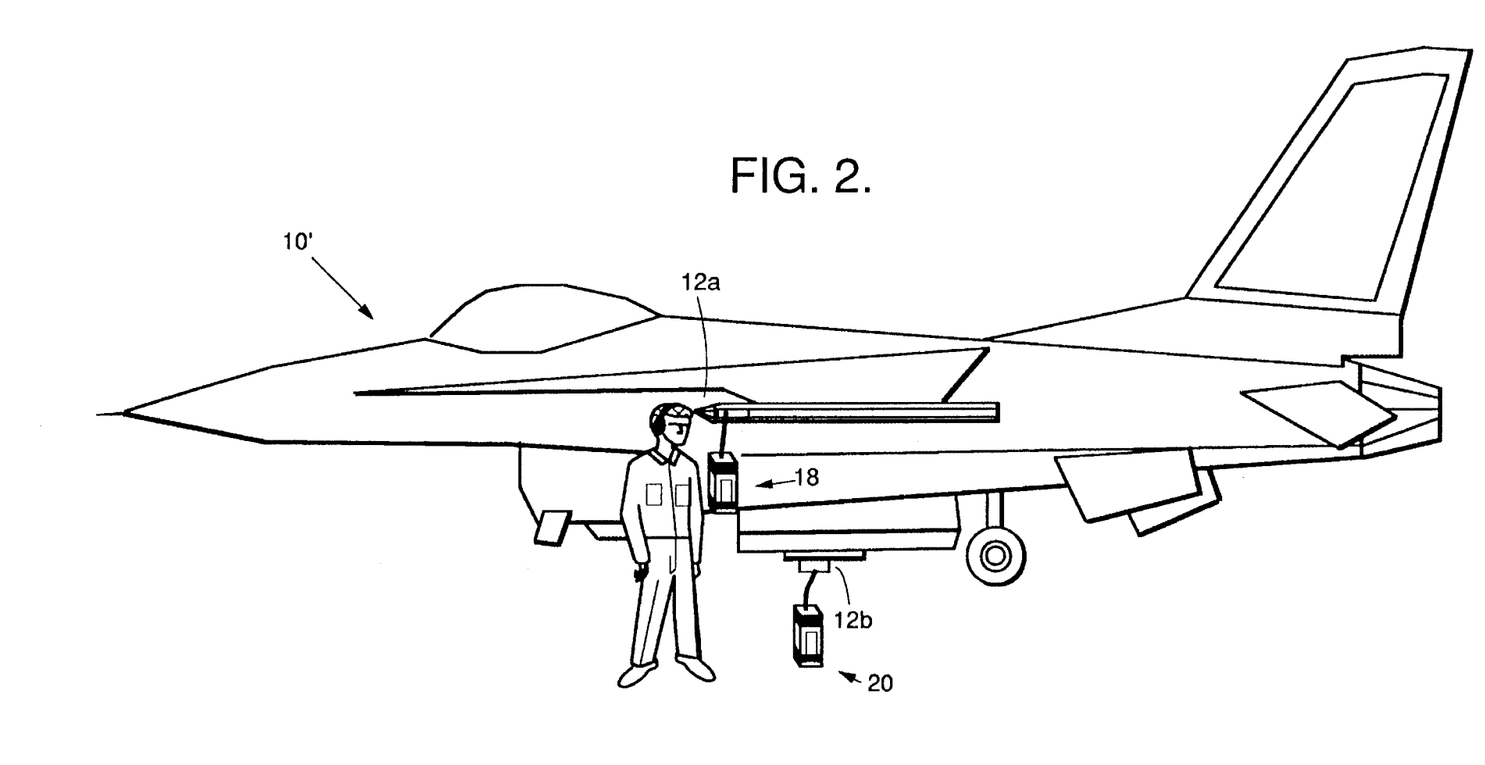
FIG. 2 is a side view of an F-16 aircraft shown similar to FIG. 1 to include a plurality of weapon station testers constructed according to the preferred embodiment of the present invention in operative connection with a corresponding plurality of weapon stations of the aircraft.

The first interchangeable fixture 16a combines with the common electronics module 14 to form a first weapon station tester 18. Analogously, the second interchangeable test fixture 16b combines with the common electronics module 14 to form a second weapon station tester 20. As shown in FIGS. 1 and 2, the first interchangeable fixture 16a is specifically adapted to interconnect the common electronics module 14 with one of the wing-tip mounted rail launcher stations 12a of the aircraft 10, and the second interchangeable fixture 16b is specifically adapted to interconnect the common electronics module 14 with one of the eject launcher weapon stations 12b.

As will be appreciated by those skilled in the art more fully below, the common electronics module 14 and interchangeable fixture 16 arrangement of the present invention is readily adaptable for operative attachment to any of a number of types of weapon stations for dynamic testing of the aircrafts' capabilities for various types of weapons. As such, it will be understood by those skilled in the art that the particular types of weapon stations shown throughout the drawings are merely exemplary.

FIG. 1 is a front view of an aircraft 10 and four weapon station testers 18 of the present invention shown operatively connected to four corresponding rail launcher stations 12a of the aircraft 10. FIG. 2 illustrates a side view of a second aircraft 10' and one of the weapon station tester 18 attached to one of the rail launcher station 12a and one of the weapon station tester 20 attached to one of the eject launcher stations 12b. The aircraft 10 of FIG. 1 is an F-15 aircraft and the aircraft 10' is an F-16 aircraft. However, it will be appreciated by those skilled in the art that the particular aircraft illustrated are merely exemplary. For the remainder of the detailed description, it will be understood that "aircraft 10" refers to either of the aircraft shown in FIGS. 1 and 2, or to any other aircraft equipped with deployable weapons.

The eject launcher stations 12b are designed for deployment of Advanced Medium Range Air-To-Air Missiles (AMRAAMS) (also commonly referred to as Air Intercept Missile-120 or AIM-120). Rail launcher stations 12a are specifically designed for deployment of AMRAAMS or sidewinder missiles (also commonly referred to as Air Intercept Missile-9, or AIM-9). Thus, in the preferred embodiment of the present invention, the weapon station testing system is adapted to mechanically engage the weapon stations 12a and 12b and adapted to test the capabilities of the aircraft 10 for AMRAAMS and Sidewinder Missiles (not shown). The present invention is also adapted to confirm the operation of the interfaces between the weapons and the aircraft 10. Significantly, as shown in FIGS. 1 and 2, no additional support equipment is required to perform complete dynamic testing of the weapon stations 12 of the aircraft 10.

As shown in FIGS. 3–8, each of the interchangeable fixtures 16a, 16b includes means for operatively interconnecting the common electronics module 14 with a specific type of weapon station 12a, 12b. Thus, the common electronics module 14 can be cooperatively arranged with an interchangeable fixture 16 for mechanical engagement with a variety of specific types of physical weapon stations 12 (e.g., as shown in the drawings, rail launcher stations and eject launcher stations) for testing the aircraft 10 and missile interface capabilities for certain weapons (e.g., AMRAAMS, Sidewinder Missiles, etc.).

FIGS. 3a, 3b and 4 through 7 illustrate the first interchangeable fixture 16a of the present invention which is operative for interconnecting the common electronics module 14 with a rail launcher weapon station 12a. Referring briefly to FIGS. 8a and 8b, a second interchangeable fixture 16b is illustrated which is specifically adapted for interconnecting the common electronics module 14 with an eject launcher missile station 12b.

Figure 3A:
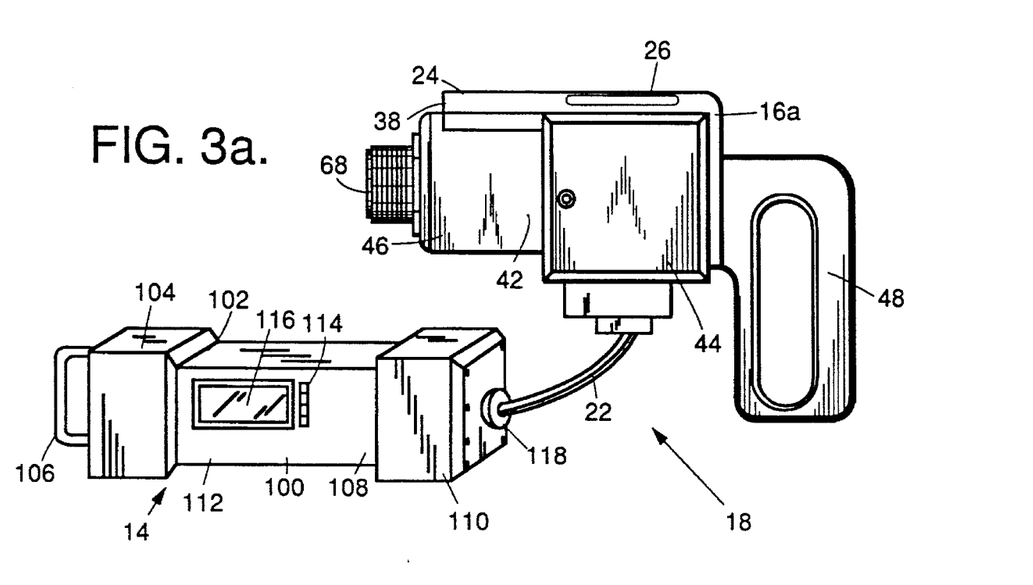
FIG. 3a is a perspective view of a first interchangeable fixture operatively connected to a common electronics module.

As shown in FIGS. 3a and 8a, the common electronics module 14 is preferably connected to the corresponding interchangeable fixture 16a, 16b through a flexible adapter cable 22. As will be discussed in further detail below, the interchangeable fixtures 16a, 16b and adapter cables 22 serve to physically connect and restrain the common electronics module 14 to the same aircraft station interfaces as utilized by actual mission stores (not shown). In this regard, the interchangeable fixtures 16a, 16b and adapter cables 22 cooperate to electrically connect to the common electronics module 14 at existing sets of attachment points without any modification to the common electronics module 14. The interchangeable fixtures 16a, 16b and adapter cables 22 are operable to attach to the aircraft station interface and maintain a fixed position during any launch cycle testing, including launch cycles that involve retraction of the umbilical interface or any other similar type of movement of the umbilical connection to the mission store (not shown).

Figure 3B:
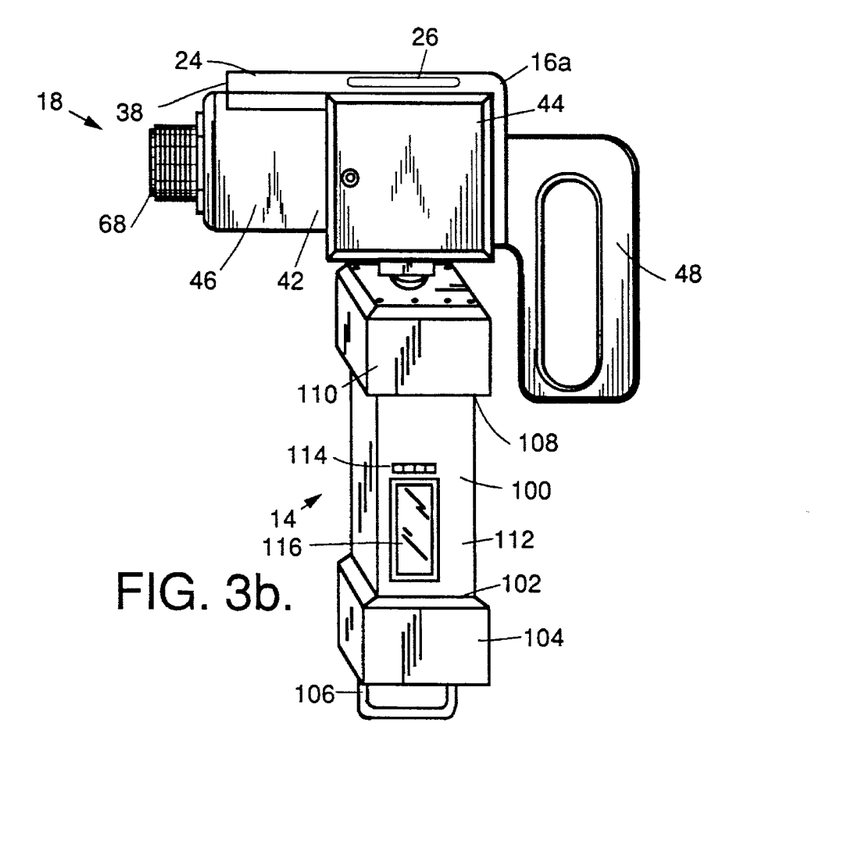
FIG. 3b is a view similar to FIG. 3a, illustrating an alternative arrangement for interconnecting the first interchangeable fixture and the common electronics module.
Figure 4:
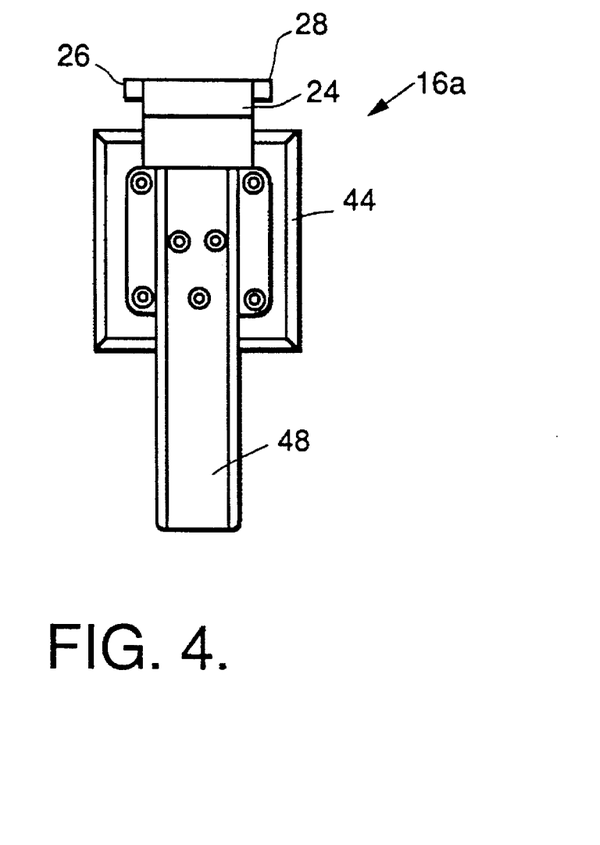
FIG. 4 is a right side view of the first interchangeable fixture of FIG. 3.

Each interchangeable fixture 16a, 16b can be attached to the common electronics module 14 either directly (as shown in FIGS. 3b and 8b) or through the flexible adapter cable 22 shown in FIGS. 3a and 8a. Incorporation of the adapter cable 22 between the interchangeable fixture 16a, 16b and the common electronics module 14 is preferred since such an arrangement advantageously provides the ability to swivel the common electronics module 14 through at least plus or minus ninety degrees from the normal, permitting attachment of the common electronics module 14 perpendicular to the interchangeable fixture 16a, 16b. This flexibility between the interchangeable fixture 16 and the common electronics module 14 provides for improved readability of the common electronics module 14 in the event that it is attached to launch platform weapon stations that are mounted in any orientation and on either side of the launch platform. Further in this regard, the common electronics module 14 can be moved, if necessary, to avoid sun glare.

Referring to FIGS. 3 through 6, the first interchangeable fixture 16a includes an upper portion 24, which in the preferred embodiment is generally constructed of aluminum, and is adapted to mechanically engage the rail launcher 12a. The upper portion 24 includes a pair of lateral spaced shoulder-like portions 26, 28 and a recess 30 (shown most clearly in FIG. 5) adapted to receive an aft detent 32 (shown in FIG. 6) of the rail launcher 12a.

Figure 5:
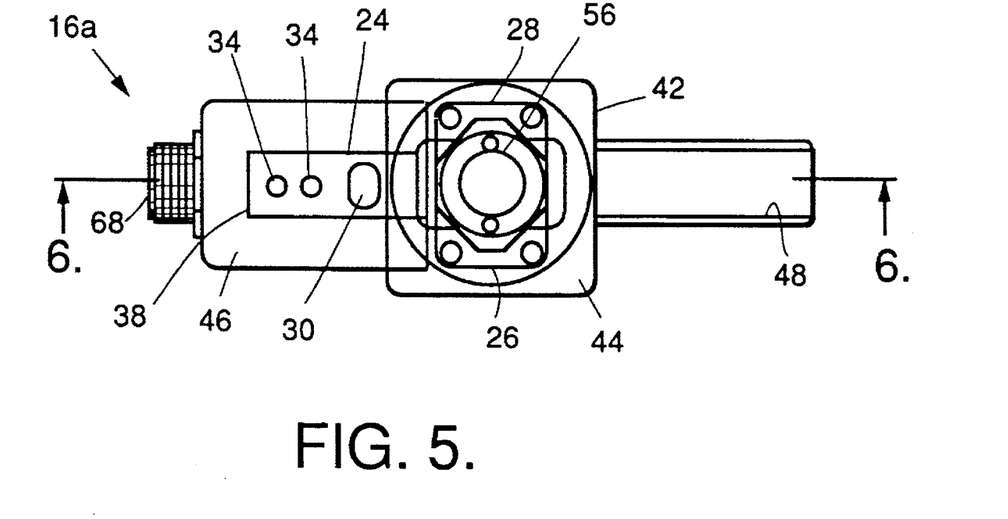
FIG. 5 is a top view of the interchangeable fixture of FIG. 3.
Figure 6:
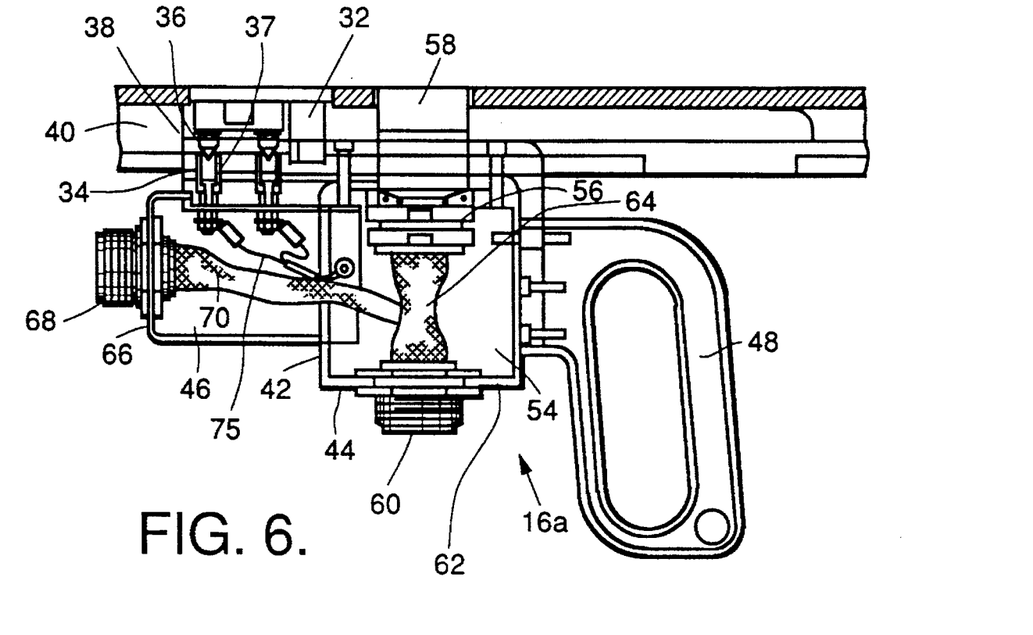
FIG. 6 is a cross-sectional view taken through the line 6—6 of FIG. 5.

The upper portion 24 additionally includes two striker point contacts 34 for receiving the striker points 36 of the rail launcher missile station 12a. The striker point contacts 34 are constructed of an electrically conductive material.

Examples of suitable materials include but are not limited to steel and copper. Each of the striker point contacts 34 is insulated from the remainder of the upper portion 24 by a generally cylindrical shield 37 of insulating material. In normal operation, the aircraft 10 delivers voltage stimulus to a Sidewinder Missile through the striker points 36. As shown in FIG. 6, to monitor the presence of these voltages, a pair of lead wires 75 interconnect the striker point contacts 34 and cable 70.

The laterally spaced shoulder-like portions 26, 28 of the upper portion 24 are adapted to fully support the weight of all components of the first weapon station tester 18 on inside grooves (not shown) of the rail launcher weapon station 12a. The upper portion 24 of the first interchangeable fixture 16a includes a front edge 38 adapted to contact a forward detent 40 (shown in FIG. 6) of the rail launcher station 12a when the first interchangeable fixture 16a is operatively engaged. The fixture 16a allows for blind umbilical engagement with the weapon station 12a, as well as stable positioning of the weapon station tester 18 during umbilical retraction. Further, the fixtures 16a are designed to engage aft and forward detents 32, 40 of the rail launcher station 12a in order to allow for stable positioning throughout repetitive umbilical engagements and retractions.

The first interchangeable fixture 16a further includes a housing 42, including a first portion 44 and a second portion 46, and a handle 48 attached to the first portion 44 of the housing 42 by bolts or other suitable fasteners. The first and second portions 44, 46 of the housing 42 are joined together and are each attached to an underside 50 of the upper portion 24 of the first interchangeable fixture 16a through bolts or other suitable features. The first portion 44 of the housing 42 defines a cavity 54 within which a first input port 56 resides. The first input port 56 preferably is an umbilical buffer connector 56 which is operative to engage a first weapon interface 58 (shown in FIG. 6) of the rail launcher weapon station 12a. In the exemplary embodiment illustrated, the first weapon interface 58 is an extended launcher umbilical connection 58 of the rail launcher weapon station 12a. In the preferred embodiment, the umbilical buffer connector 56 is a 1760 Military Standard Interface Connector. One suitable connector is commercially available as a HI-REL buffer, Part No. 44095-39P. The umbilical buffer connector 58 is interconnected to a receptacle 60 mounted at a bottom end 62 of the first portion 44 of the housing 42 through a cable 64. The receptacle 60 is provided for attachment to adapter cable 22.

At a first end 66 of the second portion 46 of the housing 42, a receptacle 68 is mounted which is electrically connected through a cable 70 to the receptacle 60 of the first portion 44 of the housing 42. As will be appreciated more fully immediately below, an adapter cable 72 is utilized to selectively interconnect the receptacle 68 with a second weapon interface 74 of the rail launcher weapon station 12a. In the exemplary embodiment illustrated, the second weapon interface 74 is a Sidewinder Missile interface.

Figure 7:
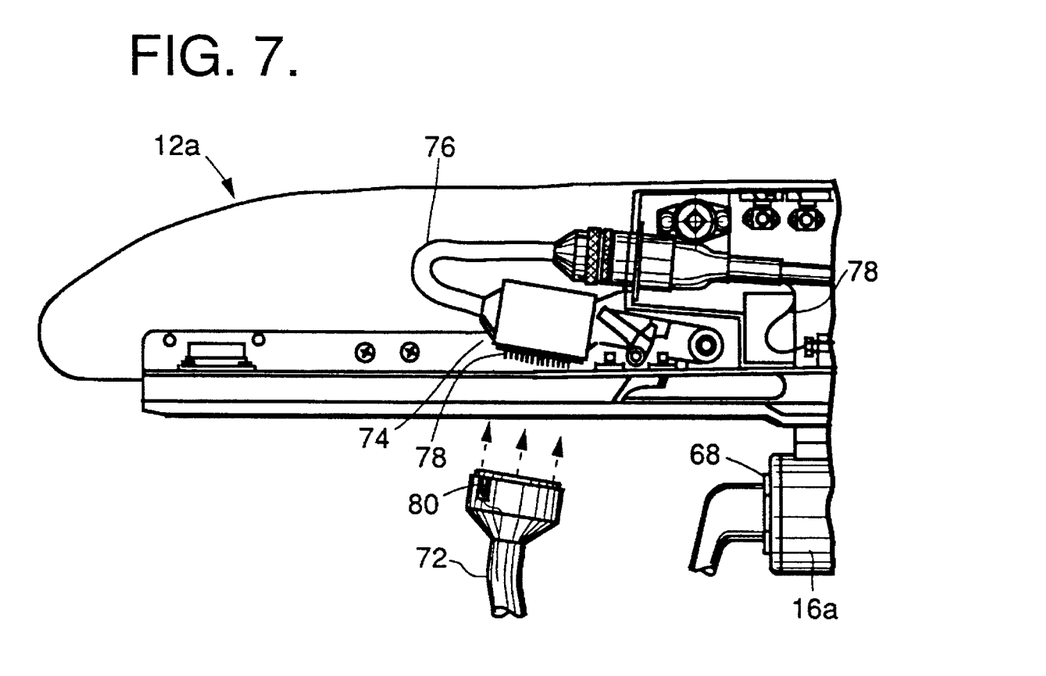
FIG. 7 is a partial cross-sectional view of the rail launcher weapon station shown in FIG. 6 illustrating the aircraft interface for a AIM-9 missile.
Figure 8A:
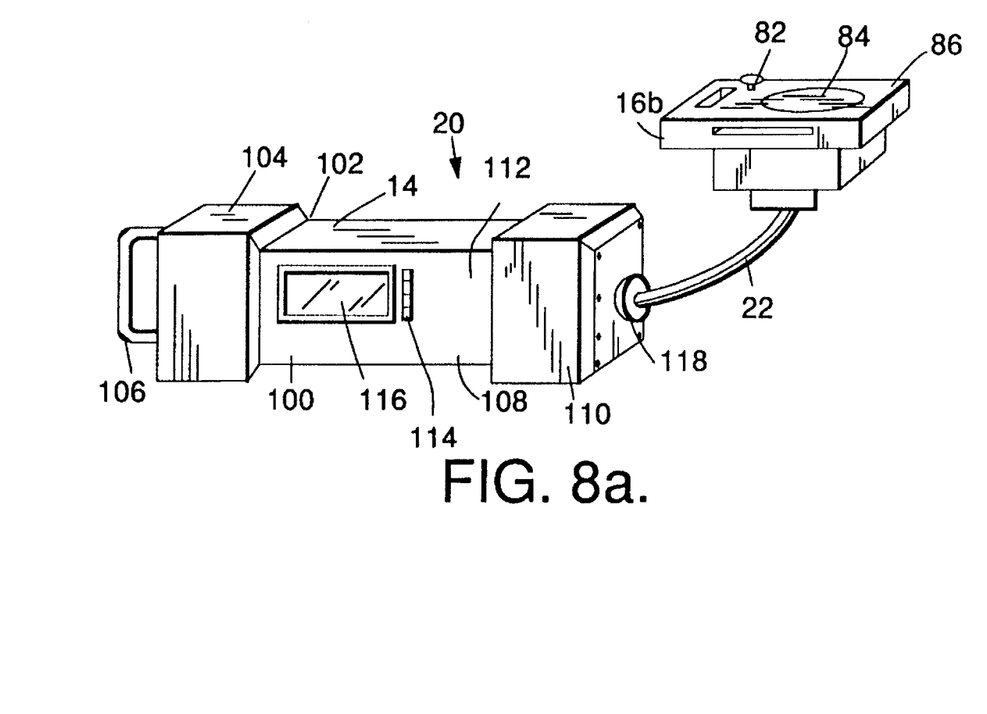
FIG. 8a is a perspective view of a second interchangeable fixture operatively connected to a common electronics module through a flexible extension cable, the second interchangeable fixture being specifically adapted to mechanically engage an eject launcher missile station.
Figure 8B:
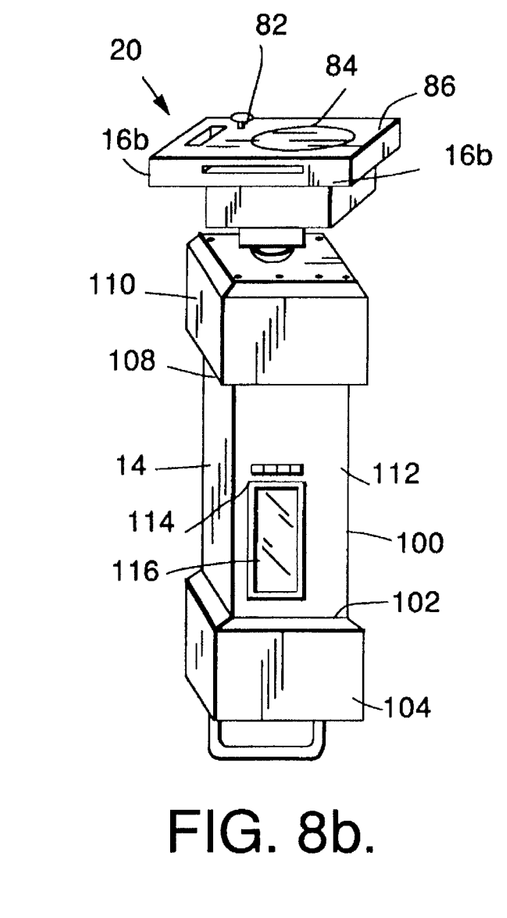
FIG. 8b is a view similar to FIG. 3b illustrating an alternative arrangement for interconnecting a second interchangeable fixture and the common electronics module.

As shown in FIG. 7, the standard military interface for a Sidewinder Missile includes an electrical harness 76 located inside the rail launcher missile station 12a. In addition to an electrical interface for communication between the aircraft 10 and a Sidewinder Missile, the Sidewinder Missile interface includes a high pressure gas nitrogen line 78 disposed within the electrical harness 76. As will be appreciated by those skilled in the art, the gas nitrogen line 78 is utilized to cool the Sidewinder Missile to enhance its heat seeking capabilities during operation.

The adapter cable 72 for interconnecting the first interchangeable fixtures 16a and the Sidewinder Missile interface 74 includes spring-loaded miniature pressure switch 80. The pressure switch 80 is an electro-mechanical device that includes circuitry (not shown) well known to those skilled in the art for monitoring the presence of pressure in the nitrogen line at a predetermined level. Upon sensing the predetermined pressure, a set of contacts (not shown) in the pressure switch 80 are closed and a real-time signal is sent to the common electronics module 14 for data collection and monitoring.

Each rail launcher missile station 12a of the aircraft 10 is prepared for testing by sliding the shoulder-like portions 26, 28 of the upper portion 24 of the first interchangeable fixture 16a through the channel on the rail launcher 12a until the forward detent 40 makes contact with the front edge 38. The operator then inserts the aft detent 32 into the recess 30. Verification of the mechanical dimensions and placement of the aft detent 32 of the rail launcher station 12a is accomplished through engagement of the aft detent 32 with the recess 30.

During testing of the launch cycle for a rail launcher weapon station 12a, the aircraft 10 and the weapon station tester 18 of the present invention simulate a launch separation. In this regard, the aircraft 10 will retract the launcher umbilical connector 58, breaking the electrical connection between the weapon station 12a and the tester 18.

In the case of connection to an ejection launcher station 12b, the second interchangeable fixture 16b will fully support the weight of all components (e.g., the common electronics module 14, interchangeable fixture 16, and cable 22) through a "button-hook" 82 similar to that located on the actual mission stores (not shown). While not specifically illustrated, the second interchangeable fixture 16b includes a 1760 Military Standard Interface Connector adapted to electrically interconnect the fixture 16b with the eject launcher station interface (not shown). Access to the connector is provided through an opening 84 located in an upper surface 86 of the fixture 16b. Distinct from the rail launcher fixture 16a, there is no requirement for the fixturing to allow for retraction of the umbilical connector in the case of testing on ejection launchers 12b.

Insofar as the interchangeable fixtures 16a, 16b shown through the drawings are meant for purposes of illustration and not limitation, it should be understood by those skilled in the art that similar fixtures can be constructed for mechanical engagement to alternative weapon station. For example, interchangeable fixtures for mechanical engagement to pylons, racks, gun systems and the like are well within the scope and spirit of the present invention.

Figure 9A:
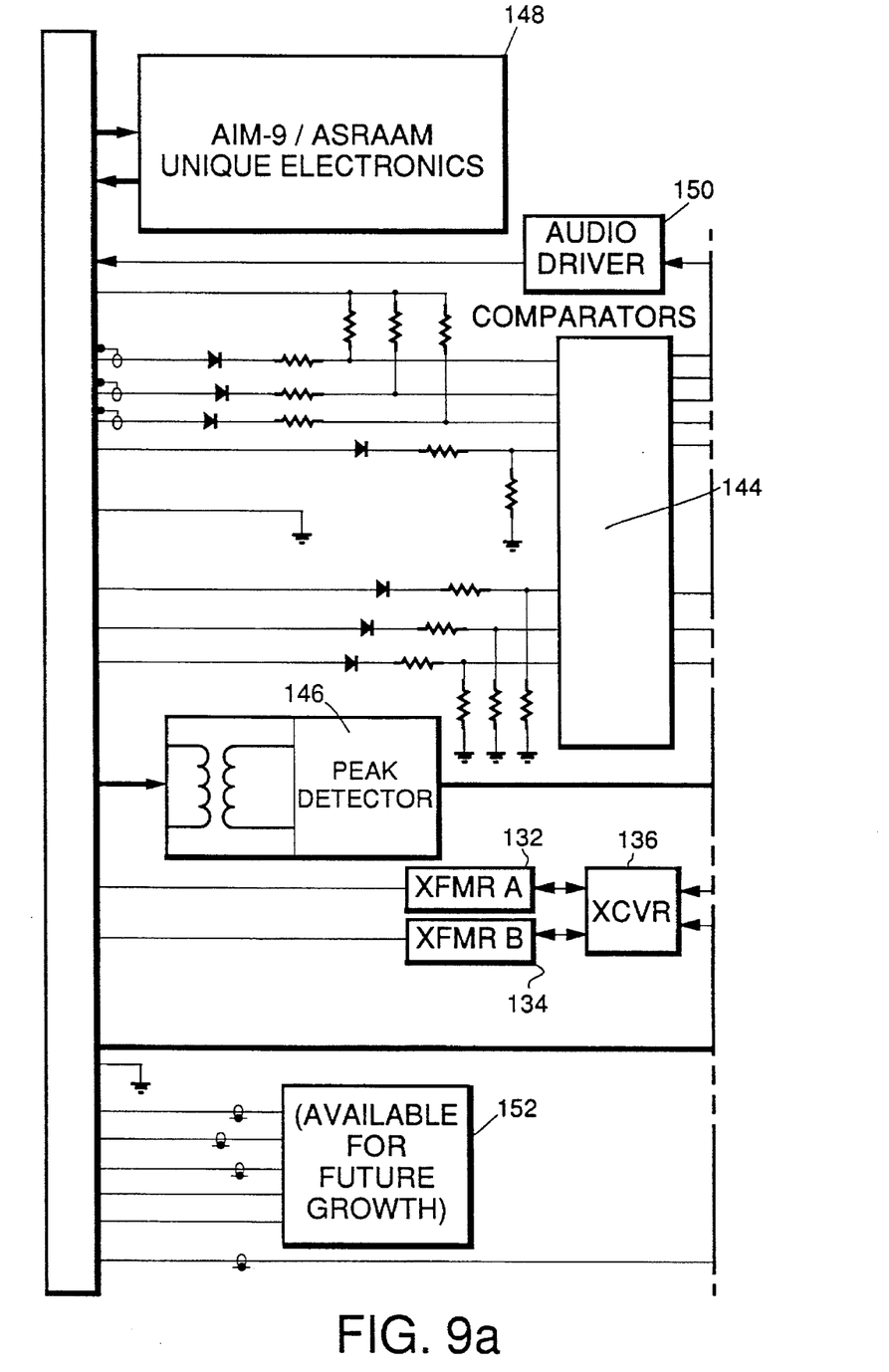
FIGS. 9a and 9b illustrate a block diagram of the common electronics module of the present invention.
Figure 9B:
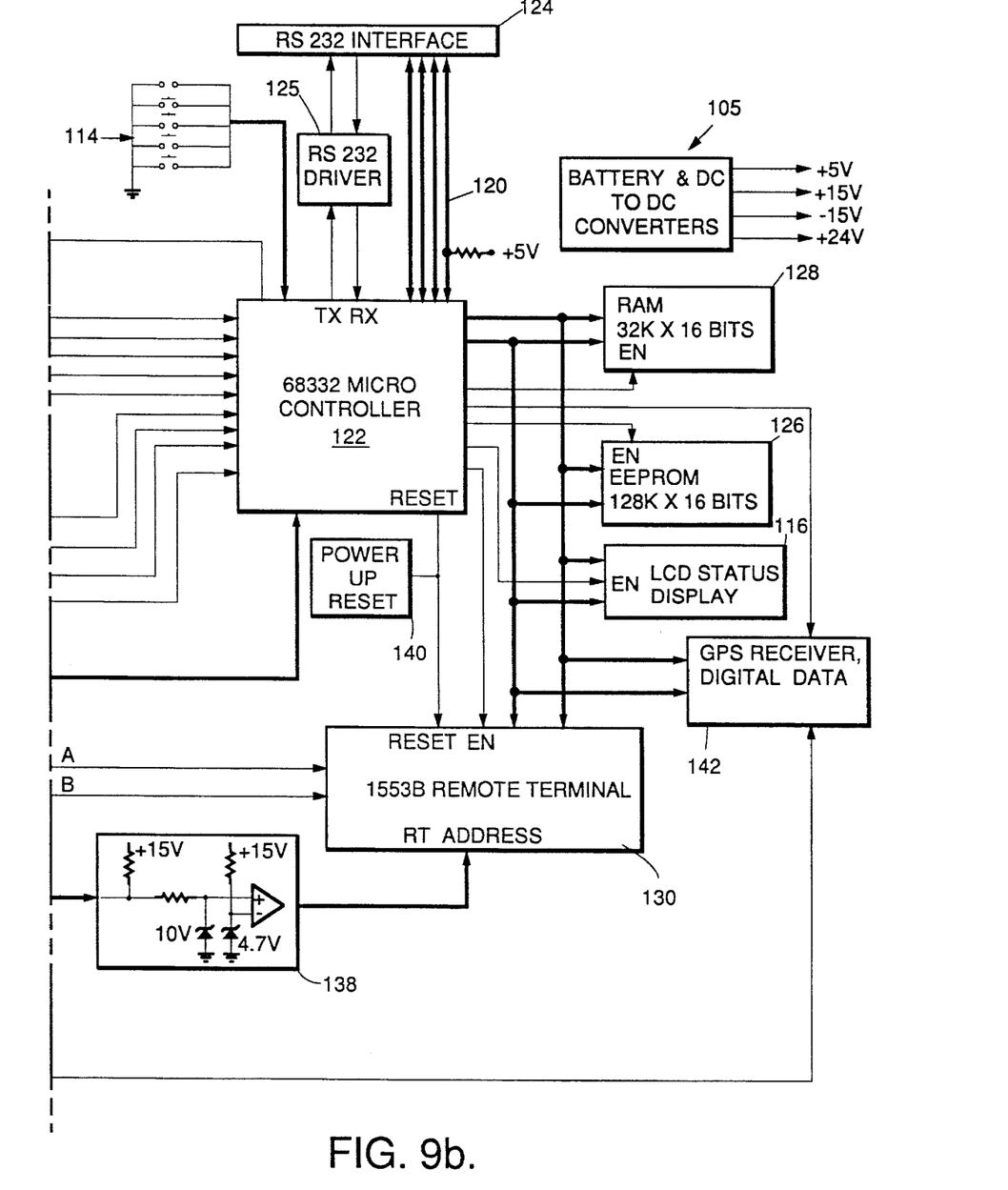

The common electronics module 14 of the present invention is illustrated in more detail in FIGS. 3a–b and 8a–b. A block diagram of an exemplary embodiment of the circuitry of the common electronics module is illustrated in FIGS. 9a and 9b. As illustrated, the common electronics module 14 is generally box-like in construction and includes a housing 100 having a central portion with four mutually perpendicular sides.

At a first end 102, the common electronics module 14 includes a removable end cap 104 which houses a self-contained power source 105 (schematically shown in FIG. 9b). Preferably, the power source 105 is a rechargeable nickel-cadmium battery pack set of rechargeable batteries. In the exemplary embodiment illustrated, the end cap 104 is removably attached to the central portion of the housing 100 by over-centered clamps (not shown). However, it should be appreciated by those skilled in the art that the end cap 104 may alternatively be removably attached with bolts or other well known fasteners. The cross-sectional dimensions of the end cap 104 are slightly greater than corresponding dimensions of the central portion of the housing 100. A handle 106 to facilitate transportation is included at the end of the end cap 104.

At a second end 108 of the central portion 100, the common electronics module 14 includes an enlarged end 110 which is substantially identical in dimensions to the end cap 104. The end cap 104 and the enlarged end 110 cooperate to protect the central portion of the housing 100.

A front side 112 of the common electronics module 14 includes a four-button keypad 114 and a display area 116. An input/output port 118 adapted to selectively interconnect the common electronics module 14 with one of the interchangeable fixtures 16 through adapter cable 22.

In the preferred embodiment, the weapon stations testing system of the present invention includes means for identifying the type aircraft weapon interface to be tested. Preferably, the identification means is provided by four signal lines 120 (shown schematically in FIG. 9B) carried by one or more of the adapter cables 64, 70 and 72. A certain combination of the signal lines 120 will be grounded so as to provide identification readable by the common electronics module 14. This identification serves to "encode" each type aircraft weapon interface so that the four bit code can be read by a microcontroller 122 resident within the common electronics module 14 (see FIG. 9b).

The microcontroller 122, recognizing the type of aircraft weapon interface that has been interconnected with the common electronics module 14, is operative to select from memory appropriate simulation and analysis routines to be performed in testing the weapon station 12 that matches the selected interchangeable fixture 16. The microcontroller 122 uses this code in conjunction with any information input through keypad 114 (shown schematically in FIG. 9b), to determine which firmware code to execute and which pass/fail criteria to use to perform the weapon system simulation and test. Results of the simulation and self-test are displayed to the operator by way of the display 116, which is preferably a liquid crystal display (LCD).

Further referring to FIGS. 9a and 9b, an industry standard RS-232 interface 124 and RS-232 driver 125 are provided to facilitate debugging of the weapons system tester and to download firmware to an EEPROM 126. This interface arrangement provides for simplified field revisions to the firmware if future modifications become necessary.

The keypad 114 is operative for the selection of a SELF-TEST and BIT/LAUNCH. The Self-Test mode of operation is selected in order to confirm proper operation of the common electronics module 14 prior to performing actual tests on the weapon stations 12 of the aircraft 10. When the Self-Test mode is selected, all inputs to the common electronics module 14 are stimulated and sensed. Also, all of the outputs from the common electronics module 14 are verified to be operational through internal self-test circuitry. No external or ancillary equipment is required to confirm proper operation of the common electronics module 14. Self-Test pass/fail indication is presented to the operator on the LCD display 116 upon completion of the test.

When the BIT/LAUNCH mode of operation is selected, the common electronics module 14 is placed in a weapon's simulation state. In the weapon's simulation state, the common electronics module 14 is operative to respond to the aircraft 10 initiated BIT or Launch protocol in a like manner as a properly functioning weapon store (not shown). During the simulation, the common electronics module 14 monitors and stores all aircraft 10 commands and responses. After completion of the launch or BIT cycle, the common electronics module 14 analyzes the recorded data to determine if parameters critical to the successful launch of the simulated weapon store are within acceptable limits. A pass/fail indication is presented to the operator on the LCD display 116.

The keypad 114 is also used to input launch platform specific test parameters. Such parameters include but are not limited to weapon station location and aircraft type. The keypad 114 is additionally used to retrieve test results from a random access memory (RAM) 128 at completion of the simulated launch or bit sequence.

The circuitry of the common electronics module 14 further includes means for capturing and recording a plurality of data transactions occurring at one of the weapon stations 12 and means for analyzing the plurality of data transactions. The means for capturing and recording comprises a Military Standard (Mil-Std) 1553 remote terminal interface 130. The Mil-Std remote terminal interface 130, which in the preferred embodiment is a dual-channel terminal, operates in conjunction with two transformers 132, 134 and a transceiver 136, to provide the ability to test a plurality of Mil-Std 1760 compliant weapon systems including but not limited to AMRAAM, JDAM, TSSAMS, and JSOW. A set of comparators 138 is provided which is operative for the 1760 compliant weapon systems embodiment of the present invention. In FIG. 9b, illustrated is one typical comparator circuit 138 of six circuits which are preferably used to convert 1553 address switch closures defined by Mil-Std-1760 to a TTL level which is useable by the remote terminal interface 130. Since the comparator circuits are identical, a complete understanding is provided through a single illustration. The address is used to program the remote terminal interface 130 to respond only to 1553 commands with a matching address.

The remote terminal interface 130 integrates dual transceiver, protocol, memory management and processor interface logic, and 4K words of internal buffered RAM. The task of the remote terminal interface 130 is to receive the serial data commands from the launch platform, record the time of occurrence, store the formatted information such that it can be retrieved by the microcontroller 122 for command interpretation and comparison to pass/fail criteria and to respond to the launch platform commands in order to simulate the responses of an actual weapon.

The microcontroller 122 operates to execute firmware resident in the EEPROM 126, interpret a command and direct the appropriate action for the particular Mil-Std 1760 weapon being simulated. The EEPROM 126 also contains software necessary for evaluation of the results of the test and display of a test summary on a LCD Status Display 116.

A power-up reset circuitry 140 is provided which monitors a system five volt power supply and issues a reset signal to the microcontroller 122 and the remote terminal 130 when the voltage exceeds a predetermined limit during power application or is less than a predetermined limit when power is removed. This function ensures that the electronics are brought up in a known predefined initial condition state during power up, power down and brownout conditions of the five volt power supply.

A Global Positioning System Receiver 142 is provided to receive and format Global Positioning System (GPS) data for weapons systems (e.g. JDAM, TSSAMS, and JSOW) which use a GPS data stream from the aircraft 10 in order to obtain position and time synchronization information.

A set of comparators 144 are provided which monitor the various discrete signals which are required to perform a successful launch of a weapons system. As will be appreciated by those skilled in the art, examples of these signals include battery squib fire and rocket motor fire signals.

Additionally, the present invention provides transformer and peak detector circuitry 146 which electrically isolates and converts 400 Hertz power forms present at the umbilical interface to a DC level prior to comparison to a predetermined voltage threshold by comparators 144. The comparators 144 have programmable voltage thresholds to accommodate the different voltage levels of the discrete signals presented by the plurality of launch platforms. Any comparator change of state interrupts the microcontroller 122 which time stamps the occurrence of the transition for later analysis.

In the preferred embodiment, the common electronics module 14 further includes a weapons system unique electronics module 148. The electronics module 148 includes circuitry to process the weapons system specific interface signals for the plurality of weapons systems which fall outside of the Mil-Std 1760 interface specification definition such as AIM-9.

Further in the preferred embodiment, an audio driver 150 is provided which is operative during testing of AIM-9 missiles. The audio driver 150 simulates the tones which an AIM-9 missile would normally generate upon power up, lock on, and tracking of a target during a launch sequence.

Upon completion of a test run involving realistic simulation of a given store's identification, BIT and Launch cycles, the common electronics module 14 will display the test results as either PASS or FAIL and, in the event of a degrade or failure, the built-in display 116 will show a brief description of the failure. In the preferred embodiment, the common electronics module 14 is capable of detecting and displaying "coarse" level failures such as "Failed Weapon Power", "Incorrect Weapon Address", "Absence of Released Consents", "MIL-STD-1553", and the like. As will be appreciated by those skilled in the art, the level of dynamic simulation and exercising of the weapon station 12, as well as the level of reported failure information significantly improves over existing testing approaches and is sufficient to direct efficient repairs of the aircraft 10.

Additionally, Mil-Std-1760 defines high bandwidth and fiber optic interface signals to accommodate growth provisions for future applications. The weapon station tester 10 of the present invention may be expanded through additional circuitry 152, to accommodate the simulation or test of these signals as new weapons systems are developed which take advantage of these expansion capabilities.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A weapon station testing system for testing the mission readiness of an aircraft having a plurality of weapon stations including a first weapon station of a first type and a second weapon station of a second type, the weapon station testing system comprising:

a common electronics module external to the aircraft, the common electronics module electronically adapted to communicate with said first and second weapon stations;

a first interchangeable fixture for operatively interconnecting the common electronics module with the first weapon station; and a second interchangeable fixture for operatively interconnecting the common electronics module with the second weapon station;

whereby said common electronics module communicates with the first and second weapon stations to ensure that the first and second weapon stations are mission ready to receive a weapon.

2. The weapon station testing system of claim 1, wherein the common electronics module includes:

i) means for capturing and recording a plurality of data transactions occurring at one of the first and second weapon stations; and ii) means for analyzing the plurality of data transactions.

3. The weapon station testing system of claim 1, wherein the first interchangeable fixture is adapted to mechanically engage a rail launcher missile station and the second interchangeable fixture is adapted to mechanically engage an eject launcher missile station.

4. The weapon station testing system of claim 1, wherein the first interchangeable fixture includes a first input port operable to electrically communicate the common electronics module with a first weapon interface and a second input port operable to electrically communicate the common electronics module with a second weapon interface of the first weapon station.

5. The weapon station testing system of claim 4, wherein the first weapon interface is an AMRAAM interface and the second weapon interface is a AIM-9 missile interface.

6. The weapon station testing system of claim 5, wherein the common electronics module further comprises means for selectively executing a first series of simulated weapons stores responses for testing the mission readiness of the first weapon interface and a second series of simulated weapons stores responses for testing the mission readiness of the second weapon interface.

7. The weapon station testing system of claim 6, further comprising means for identifying one of the first and second weapon interfaces such that the electronics module executes the first series of simulated weapons stores responses when interconnected to the first weapons interface and the common electronics module executes the second series of weapons stores responses when interconnected to the second weapon interface.

8. A weapon station testing system for testing the mission readiness of an aircraft of the type including a plurality of weapon stations, a first weapon station of a first type at least including a first weapon interface adapted for electrically communicating with a first type of weapon and a second weapon station of a second type at least including a second weapon interface adapted to electrically communicate with a second type of weapon, the weapon station testing system comprising:

a common electronics module external to the aircraft; and a first interchangeable fixture for mechanically engaging the first weapon station, the first interchangeable fixture adapted for interconnecting the first interface with the common electronics module;

a second interchangeable fixture for mechanically engaging the second weapon station, the second interchangeable fixture adapted for interconnecting the second interface with the common electronics module;

whereby said common electronics module communicates with the first and second weapon stations to ensure that the first and second weapon stations are mission ready to receive first and second types of weapons respectively.

9. The weapon station testing system of claim 8, wherein the first interchangeable fixture is adapted to mechanically engage a rail launcher weapon station.

10. The weapon station testing system of claim 9, wherein the first weapon interface is an AMRAAM interface and the second weapon interface is a AIM-9 missile.

11. The weapon station testing system of claim 8, wherein the common electronics module includes:
   i) means for capturing and recording a plurality of data transactions occurring at one of the plurality of weapon stations; and
   ii) means for analyzing the plurality of data transactions.

12. The weapon station testing system of claim 11, wherein the common electronics module further comprises means for selectively executing a first series of simulated weapons stores responses for testing the mission readiness of the first weapon interface and a second series of simulated weapons stores responses for testing the mission readiness of the second weapon interface.

13. The weapon station testing system of claim 12, further comprising a first cable for interconnecting the first weapon interface and the common electronics module and a second cable for interconnecting the second weapon interface and the common electronics module, and further wherein the means for identifying comprises a first set of wires carried by the first cable and a second set of wires carried by the second cable, the first and second sets of wires each being grounded in a distinct combination.

14. The weapon station testing system of claim 12, further comprising means for identifying one of the first and second weapon interfaces such that the electronics module executes the first series of simulated weapons stores responses when interconnected to the first weapons interface and the common electronics module executes the second series of weapons stores responses when interconnected to the second weapon interface.

15. The weapon station testing system of claim 14, further comprising a second fixture adapted for interconnecting the common electronics module with a second weapon station.

16. A method for testing the mission readiness of an aircraft weapons system of the type having a plurality of weapon stations including a first weapon station of a first type and a second weapon station of a second type, the first weapon station having a first weapon interface adapted for electrically communicating with a first type of weapon and a second weapon station having a second weapon interface adapted to electrically communicate with a second type of weapon, the method comprising the steps of:
   providing an aircraft weapons testing system including:
   i) a common electronics module external to the aircraft;
   ii) a first interchangeable fixture for engaging the common electronics module with the first weapon station, the first interchangeable fixture including a first input port adapted to selectively electrically communicate with the first weapon interface; and
   iii) a second interchangeable fixture for operatively interconnecting the common electronics module with the second weapon station;
   interconnecting the common electronics module with the first interchangeable fixture;
   mechanically engaging the first interchangeable fixture with the first weapon station;
   recording at least one data transaction occurring at the first weapon station;
   interconnecting the common electronics module with the second interchangeable fixture;
   mechanically engaging the second interchangeable fixture with the second weapon station; and
   recording at least one data transaction occurring at the second weapon station;
   whereby the steps of recording at least one data transaction occurring at the first weapon station and recording at least one data transaction occurring at the second weapon station permit subsequent analysis of communication between the first weapon interface and the first type of weapon and between the second interface and the second type of weapon, thereby confirming mission readiness of the aircraft weapons system.

17. The method of claim 16, wherein the step of recording at least one data transaction at the first weapon station comprises recording a first data transaction through the first weapon interface and recording a second data transaction through the second weapon interface.

18. The method of claim 17, wherein the step of recording a first data transaction includes the step of receiving the first data transaction through the first input port, and the step of recording the second data transaction includes the step of receiving the second data transaction through the second input port.

19. The method of claim 18, further comprising the step of selectively executing a first series of simulated weapons stores responses for testing the mission readiness of the first weapon interface and a second series of simulated weapons stores responses for testing the mission readiness of the second weapon interface.

20. The method of claim 19, wherein the step of selectively executing comprises the step of identifying one of the first and second weapon interfaces such that the common electronics module identifies the first weapon interface when interconnected thereto and the common electronics module identifies the second weapon interface when interconnected thereto.

* * * * *